Oct. 12, 1926.

W. B. MATHEWSON 1,603,259

DISHWASHING MACHINE

Filed Dec. 19, 1921   2 Sheets-Sheet 2

Inventor.
Wilfred B. Mathewson
by Heard Smith & Tennant
Attys.

Patented Oct. 12, 1926.

1,603,259

UNITED STATES PATENT OFFICE.

WILFRED B. MATHEWSON, OF NORTH WEYMOUTH, MASSACHUSETTS.

DISHWASHING MACHINE.

Application filed December 19, 1921. Serial No. 523,448.

This invention relates to dish washing machines of that type comprising a tank to contain the water or cleansing fluid, a dish carrier mounted in the tank for rotation about a vertical axis, and means to deliver a spray or jets of water against the dishes as they are rotated in the carrier.

One of the objects of the invention is to provide a novel washing machine having a construction by which the dish carrier can be elevated in the tank so as to place it at the top thereof and in position where the dishes can be conveniently placed in it or removed from it.

Another object of the invention is to provide novel means for thus elevating the dish carrier which is operated by the means that rotate the dish carrier.

A further object of the invention is to provide an improved construction by which the dish carrier when elevated will be steadied and prevented from tilting laterally.

A still further object of the invention is to provide novel means for steadying the dish carrier while the machine is being used for washing dishes so that the operation of the machine is not interfered with even though the weight of the dishes in the carrier is not evenly distributed.

A still further object of the invention is to provide novel means of supporting the dish carrier and otherwise improving dish washing machines all as will be more fully hereinafter set forth.

In order to give an understanding of the invention I have illustrated in the drawings a selected embodiment thereof which will now be described after which the novel features will be pointed out in the appended claims.

Figure 1:
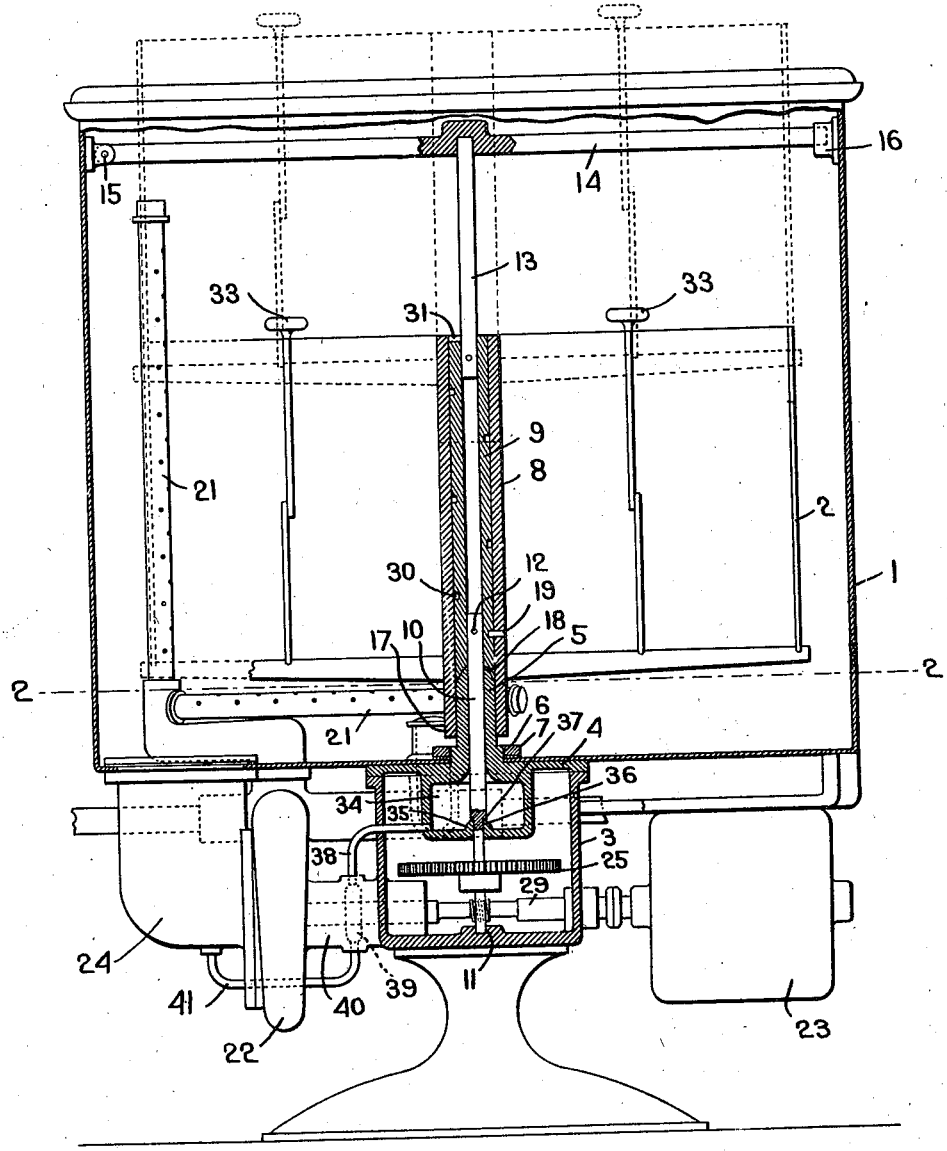
Fig. 1 is a vertical sectional view through a dish washing machine embodying my invention.

In the machine herein illustrated 1 indicates the tank or receptacle to receive the water or other cleansing fluid and 2 indicates the dish carrier or basket which receives the dishes to be washed and which is rotatably mounted in the tank.

21 indicates spray pipes adapted to spray water onto the dishes contained in the carrier 2 as the latter rotates. The water is delivered to the spray pipes by means of a rotary pump 22 which is directly connected to a suitable motor 23. The inlet of the pump communicates with a sump or well 24 which also has communication with the tank so that when the pump is operating the water in the tank will be continuously circulating through the pump and spray pipes. The dish carrier 2 is rotated by suitable means actuated by the motor 23.

The parts thus far described are or may be all as illustrated and described in my copending application Ser. No. 523,447, filed December 19, 1922.

The present invention relates to the manner of supporting and operating the dish carrier.

Situated beneath the tank and forming a support therefor is a gear housing 3 having a removable cover 4 on which the tank rests, said cover having a post 5 rising therefrom which extends through an opening in the tank and which constitutes a support for sustaining the basket or dish carrier 2. This post 5 has the enlarged screw-threaded portion 6 which receives a clamping nut 7, the latter operating to clamp the bottom of the tank between itself and the cover 4 and thus make a tight joint at this point.

The dish carrier 2 is provided with a central hub or sleeve 8 which encircles a shaft section 9 that is provided with an extension 10 which extends down through the post 5 and finds a bearing therein, the lower end of the extension 10 having a step bearing in the bottom of the gear housing 3, as shown at 11. The shaft section 9 may, if desired, be made of a length of tubing, the lower end of which receives the upper end of the shaft section 10 and is rigidly secured thereto by means of a pin 12. The tubular shaft section 9 has another extension 13 secured to its upper end which finds a bearing in a cross arm 14 that extends across the upper end of the tank 1 and is pivotally connected to the wall of the tank as shown at 15, the other end of the cross bar being received in a rest or support 16. The tubular hub member or sleeve 8 of the dish carrier extends below the latter, as shown at 17 and this extension 17 fits closely about the post 5.

A connection between the sleeve 8 and the tubular shaft section 9 is provided by which the weight of the dish carrier is sustained by the shaft section, and said shaft section rests and turns on the post 5. The post 5, therefore, takes the entire weight of the dish carrier. The upper end of the post 5 is provided with the cone-shaped bearing 18 and the lower end of the shaft section 9 is shaped to fit this cone-shaped bearing.

For transmitting the weight of the carrier to the shaft section 9 I have shown a pin or projection 19 rigid with and extending inwardly from the sleeve 8 and occupying a notch 20 in the shaft section 9. With this construction the weight of the dish carrier and dishes therein are sustained by the post 5 and the shaft section 10 is relieved entirely from any strain due to the weight. The gearing for rotating the shaft 10 comprises a gear 25 fast thereon, which meshes with and is driven by a pinion 26 on a vertical shaft 27, the latter having a worm gear 28 thereon which meshes with and is driven by a worm on the motor shaft 29.

This gearing constitutes a reducing gear arranged so that the dish carrier will have a relatively slow speed of rotation. This form of bearing for the dish carrier has the advantage that it is simple in construction and has a further advantage in that it is practically water tight. The normal water level in the tank 1 will be slightly below the top of the post 5 and the manner in which the shaft section 9 is supported on the post makes a practically water tight joint without the use of a stuffing box.

Figure 2:
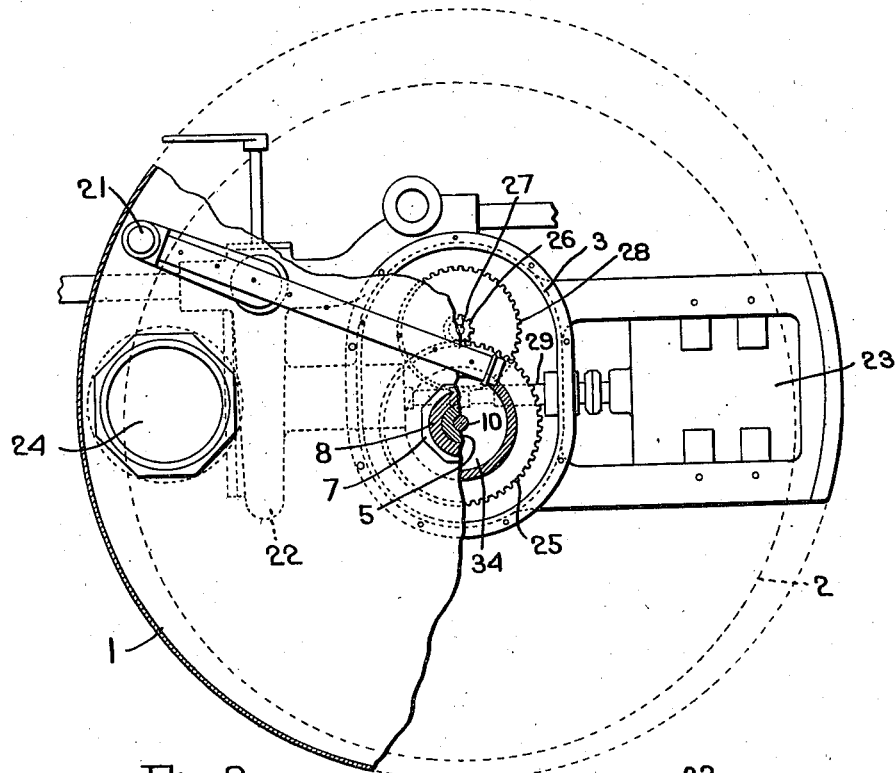
Fig. 2 is a section on the line 2—2, Fig. 1 with part of the tank broken out.
Figure 3:
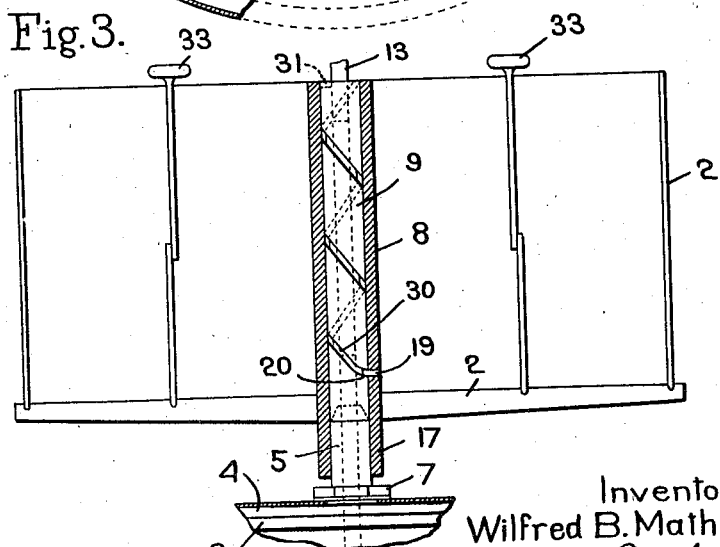
Fig. 3 is a fragmentary sectional view showing in more detail the means for raising the dish carrier.

My invention also comprehends a novel means for elevating the dish carrier to the top of the tank so as to place it in convenient position for the operator to deposit dishes therein or remove them therefrom. For this purpose I provide the shaft section 9 with a spiral slot 30 which extends clear to the top of the shaft section, said slot communicating at its lower end with the notch 20. With this arrangement if there be a relative rotation in the proper direction between the shaft 9 and the sleeve 8 of the basket, the projection 19 will be screwed up the spiral slot 30 thereby raising the basket. This relative turning movement may be secured by holding the basket from rotation and rotating the shaft 9. The basket is shown as provided with handles 33 which may be grasped in order to hold it from rotating. If the basket is thus held from rotation and the shaft 9 is turned anti-clockwise in Fig. 2 the rotation of the shaft will carry the projection 9 up the inclined groove 30 thus elevating the basket. The inclination or pitch of the groove 30 is so steep that when the basket is free to turn it will rotate with the shaft rather than ride up the groove but by holding the basket positively from turning it may be raised as above described.

When the basket has been raised so that the pin or projection 19 is at the upper end of the shaft said pin or projection will pass out of the slot 30 and rest on the top of the shaft section 9. Said shaft section is provided with a notch 31 into which the projection 19 may be positioned thereby to retain the dish carrier in its elevated position. It will be understood, of course, that when the dish carrier is to be raised the cover 32 of the tank will have to be removed and the cross bar 14 swung up out of the way.

When the dish carrier is in this elevated position the extension 17 of the sleeve 8 has a bearing on the upper end of the shaft section 9 and thus constitutes means for steadying the dish carrier and retaining it in upright position.

When the dish carrier is to be lowered it is raised sufficiently so as to withdraw the projection 19 from the notch 31 and then it is turned until the projection 19 comes into alignment with the slot 30 at which time the dish carrier will gravitate downwardly into its normal position with the projection 19 in the notch 20.

The gear housing 3 is designed to contain lubricant for keeping the gears and shaft bearings properly lubricated and in order to make doubly sure that no water will find its way into the gear housing along the shaft 10 I have made the cover 4 of the gear housing with the chamber 34 through which the shaft 10 extends, the bottom of said chamber having a boss 35 rising therefrom provided with cone bearing surface 36 which engages a complemental shaped or undercut bearing surface 37 formed on the shaft section 10.

The drain pipe 38 connects the bottom of the chamber to a drain chamber 39 formed in the bearing 40 of the pump shaft and this drain chamber is connected by a pipe 41 to the sump 24. During the operation of the pump there will be sufficient suction at the inlet side of the pump to draw from the chambers 34 and 39 any water which may accumulate therein and with this construction all danger of water working its way into the gear housing is obviated.

I claim:—

1. In a dish washing machine, the combination with a tank, of a rotatable dish carrier therein, a vertical sleeve carried by the dish carrier, a shaft section extending through said sleeve and having a spiral slot therein, a projection extending inwardly from the sleeve and occupying said slot, means to rotate the shaft section, and handles mounted on the dish carrier and by which it may be restrained from rotary movement with the shaft section thereby to cause the pin to ride up in the spiral slot and elevate the dish carrier.

2. In a dish washing machine, the combination with a tank, of a rotatable dish carrier therein, a vertical sleeve carried by the dish carrier, a shaft section extending through said sleeve and having a spiral slot therein, a projection extending inwardly from the sleeve and occupying said slot, means to rotate the shaft section, and handles mounted on the dish carrier and by which it may restrained from rotary movement with the shaft section thereby to cause the pin to ride up in the spiral slot and elevate the dish carrier, said shaft section having a notch at its upper end to receive the pin when the dish carrier is in elevated position, thereby to retain the carrier in its elevated position.

3. In a dish washing machine, the combination with a gear housing member having a gear chamber, of a cap for said member which closes the top of said chamber, a tank supported on said cap, a post rigid with and rising from said cap, said post extending through the bottom of the tank, a dish carrier rotating shaft extending through the post, a spray pipe, a pump for pumping water under pressure through the spray pipe, a motor for rotating the shaft and operating the pump, said cap having a drain chamber situated within the gear housing member but separate from the gear chamber and through which the shaft passes, and a drain pipe leading from said drain chamber.

4. In a dish washing machine, the combination with a gear housing member having a gear chamber, of a cap for said member which closes the top of said chamber, a tank supported on said cap, a post rigid with and rising from said cap, said post extending through the bottom of the tank, a shaft extending through the post and by which a dish carrier may be rotated, a spray pipe, a pump for pumping water under pressure through the spray pipe, a motor for rotating the shaft and operating the pump, said cap having a drain chamber situated within the gear housing member but separate from the gear chamber and through which the shaft passes, and a drain pipe leading from said drain chamber and connected to the inlet side of the pump.

5. In a dish washing machine, the combination with a tank, of a support beneath the tank and on which said tank rests, a post rigid with the support and extending through the bottom of the tank, a dish carrier suspended by and rotatably mounted on said post, means to rotate said carrier and to deliver a spray of water onto the dishes therein, a cross bar situated within the tank above the dish washer and extending diametrically across said tank, said bar having one end pivoted to the wall of the tank, and a shaft rising from the dish carrier and having its upper end journalled in the cross bar.

In testimony whereof, I have signed my name to this specification.

WILFRED B. MATHEWSON.